United States Patent
Edwards et al.

(10) Patent No.: US 7,441,273 B2
(45) Date of Patent: Oct. 21, 2008

(54) VIRUS SCANNER SYSTEM AND METHOD WITH INTEGRATED SPYWARE DETECTION CAPABILITIES

(75) Inventors: Jonathan L. Edwards, Portland, OR (US); Andrew A. Woodruff, Portland, OR (US); Candace M. Worley, Portland, OR (US); Ryan L. Allphin, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 377 days.

(21) Appl. No.: 10/952,039

(22) Filed: Sep. 27, 2004

(65) Prior Publication Data

US 2006/0075499 A1 Apr. 6, 2006

(51) Int. Cl.
*G06F 21/00* (2006.01)
(52) U.S. Cl. .......................... 726/24; 713/188
(58) Field of Classification Search ............. 726/22–25; 713/165, 188; 715/769, 788, 799, 825
See application file for complete search history.

(56) References Cited

U.S. PATENT DOCUMENTS

| | | | | |
|---|---|---|---|---|
| 5,754,939 A * | 5/1998 | Herz et al. | ............... | 715/501.1 |
| 6,049,336 A * | 4/2000 | Liu et al. | ................... | 715/830 |
| 6,411,311 B1 * | 6/2002 | Rich et al. | .................. | 715/769 |
| 6,779,117 B1 * | 8/2004 | Wells | ......................... | 726/24 |
| 2003/0159070 A1 | 8/2003 | Mayer et al. | ................ | 713/201 |
| 2004/0034794 A1 * | 2/2004 | Mayer et al. | ................ | 709/224 |
| 2004/0064736 A1 | 4/2004 | Obrecht et al. | ............. | 713/201 |
| 2005/0257268 A1 * | 11/2005 | Guo et al. | ..................... | 726/25 |
| 2005/0278785 A1 * | 12/2005 | Lieberman | ................... | 726/24 |

FOREIGN PATENT DOCUMENTS

WO 2005/084177 9/2005

OTHER PUBLICATIONS

European Search Report from Application No. GB0519124.2 dated Dec. 21, 2005.
Trend Micro, OfficeScan Corporate Edition 6, Administrator's Guide, Jul. 2004 http://uk.trendmicro-europe.com/global/products/collaterals/manual/gsg_01_osce_65_en.pdf.
Trend Micro, OfficeScan 7, Administrator's Guide, Mar. 2005 http://www.trendmicro.com/ftp/documentation./guides/osce-v7-ag.pdf.
John Clyman et al, "Spy Stoppers", PC Magazine, pcmag.com, Mar. 2, 2004 http://www.pcmag.com/print_article2/0,1217,a=118700,00.asp.
Examination Report from GB Application No. GB0519124.2 which was issued on Jul. 28, 2008.

* cited by examiner

*Primary Examiner*—Gilberto Barron, Jr.
*Assistant Examiner*—Abdulhakim Nobahar
(74) *Attorney, Agent, or Firm*—Zilka-Kotab, PC; Christopher J. Hamaty

(57) ABSTRACT

A system, method and computer program product are provided for scanning for spyware utilizing a virus scanner. In use, at least one computer is scanned for viruses utilizing a virus scanner. Still yet, the computer is further scanned for spyware utilizing the virus scanner. Such computer is scanned for the spyware by scanning a registry associated therewith.

20 Claims, 6 Drawing Sheets

VIRUS SCANNER SYSTEM AND METHOD WITH INTEGRATED SPYWARE DETECTION CAPABILITIES

FIELD OF THE INVENTION

The present invention relates to network security, and more particularly to virus scanners.

BACKGROUND

In the space of just a decade, the Internet, because it provides access to information, and the ability to publish information, in revolutionary ways, has emerged from relative obscurity to international prominence. Whereas, in general, an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. These opportunities have been exploited time and time again by many types of malware including, but is not limited to computer viruses, worms, Trojan horses, etc. As experience has shown, the frontier of cyberspace has its share of scofflaws, resulting in increased efforts to protect the data, resources, and reputations of those embracing intranets and the Internet.

Recently, some new types of software have emerged, collectively called "spyware." Spyware, while not as malicious as the aforementioned conventional viruses, Trojan horses, etc., may still cause problems for computer users. For example, spyware may be designed to log keystrokes, track which websites a computer user visits, and/or transmit personal information to a third party.

In the context of the present description, the term spyware is further deemed to include other related types of similar software such as adware, dialer software, other equivalents, and/or any other software that is less malicious than conventional malware. For example, adware is typically designed to download and display advertisements on a screen of a computer, and can be very intrusive. Dialer software, on the other hand, is designed to redirect a dial-up Internet Service Provider (ISP) connection of a computer to a different, more expensive phone number, in exchange for access to something, typically pornography.

Often, this software is marketed as legitimate applications which the computer user ostensibly installs willingly. For example, a free music player application may be come bundled with adware and require that the adware be installed before the music player application will work. The owner of the adware conventionally pays the owner of the music player to include the adware.

Although some of these examples of spyware border on legitimacy, many of these applications are poorly written, and cause compatibility problems with other software. Moreover, spyware can be very intrusive, waste network bandwidth, and cause a slew of other problems.

Currently, there is a market for applications (e.g. spyware scanners, etc.) which scan a computer for these types of software. Such applications remove such software, and repair any other incidental damage that may have been caused (e.g. the alteration of web browser configuration data, etc.).

While there are a number of stand-alone products which provide such services, there are numerous related problems. For example, there may be a performance impact when a spyware scanner is run simultaneously with a virus scanner. There is also often some duplication of effort between such spyware and virus scanners, thus wasting resources. Further, spyware scanners are not designed with enterprises in mind in terms of deployment, reporting, and updating mechanisms. Still yet, even an enterprise-ready spyware scanner introduces duplication in deployment, reporting and updating.

There is thus a need for overcoming these and/or other problems associated with the prior art.

SUMMARY

A system, method and computer program product are provided for scanning for spyware utilizing a virus scanner. In use, at least one computer is scanned for viruses utilizing a virus scanner. Still yet, the computer is further scanned for spyware utilizing the virus scanner. Such computer is scanned for the spyware by scanning a registry associated therewith.

In one embodiment, the registry associated with the computer may be conditionally scanned based on user input. Further, the virus scanner may include a graphical user interface. Optionally, the graphical user interface may include a field for receiving the user input. Such field may even be displayed in an options menu.

In another embodiment, the field of the graphical user interface may include a list of items associated with the computer. Such items may include the registry. In one embodiment, the registry may include a location on the computer for storing information such as hardware that is attached to the computer, system options that have been selected, a configuration of memory of the computer, and/or application programs to be present when an operating system of the computer is started. As an option, the aforementioned listed items may further include local drives, fixed drives, removable drives, network drives, running processes, a user profile folder, and/or a recycle bin.

In still yet another embodiment, the items may be listed in a first list. Such first list may include items associated with the computer which are currently being scanned. Associated therewith is a second list that may be displayed upon the selection of an icon (e.g. an "add" icon, etc.). Such items of the second list may include items associated with the computer which are capable of being scanned upon the selection thereof. In use, the items of the second list may be moved to the first list upon the selection thereof, thus prompting such moved items to be the subject of scanning.

As yet another option, spyware signatures and virus signatures of the virus scanner may be updated via a network. More particularly, the spyware signatures and the virus signatures of the virus scanner may be updated together and/or simultaneously.

DETAILED DESCRIPTION

Figure 1:
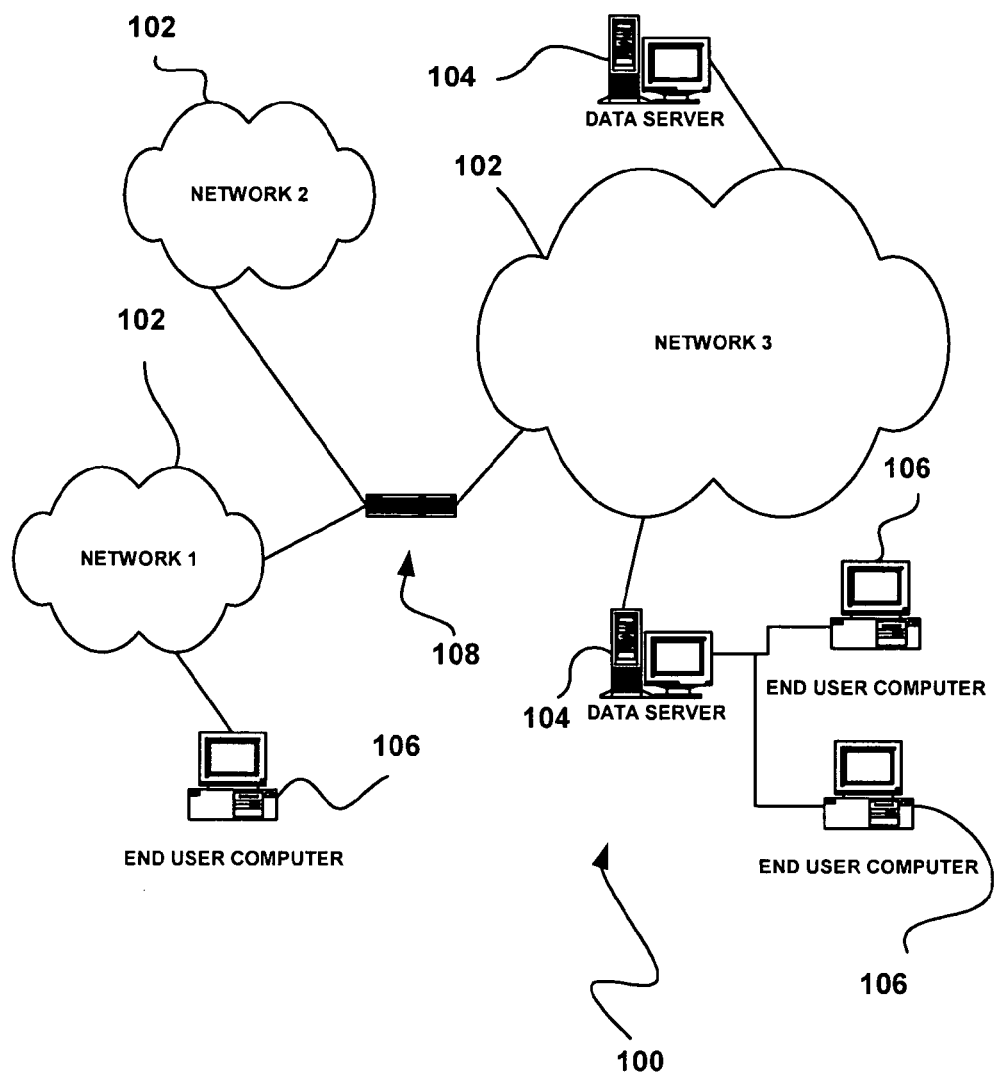
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various security features. For example, the various data server computers 104 and/or end user computers 106 may be equipped with security functionality in the form of a virus scanner, etc. for purposes that will be set forth hereinafter in greater detail. More information regarding optional functionality and architectural features will now be set forth for illustrative purposes.

Figure 2:
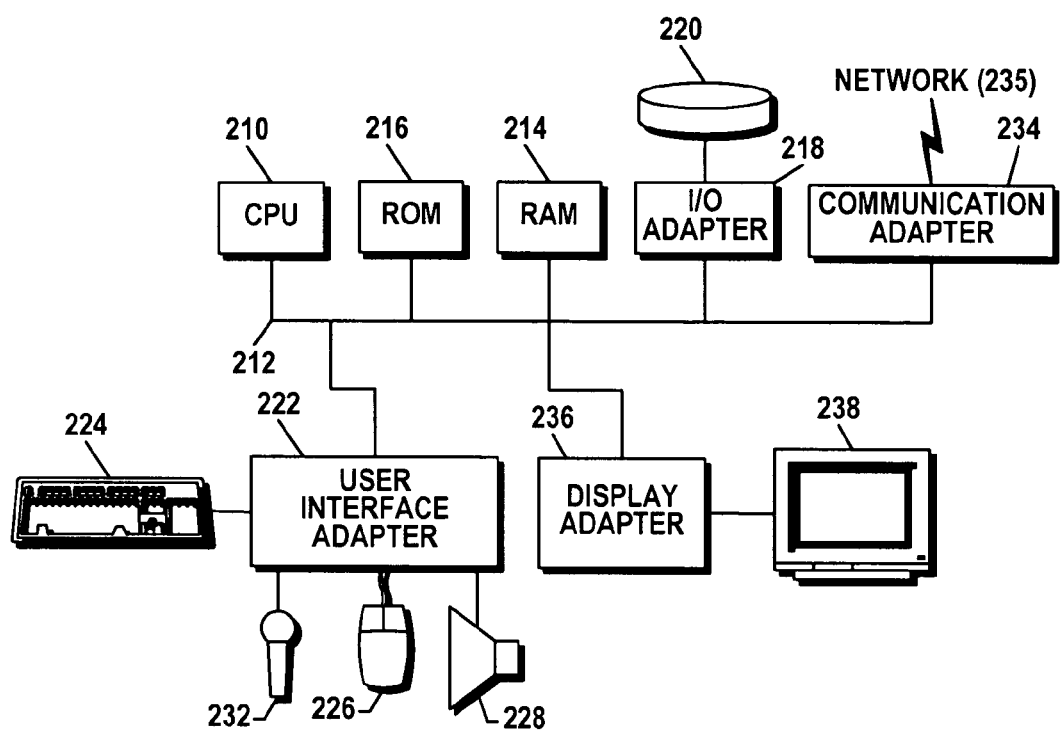
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
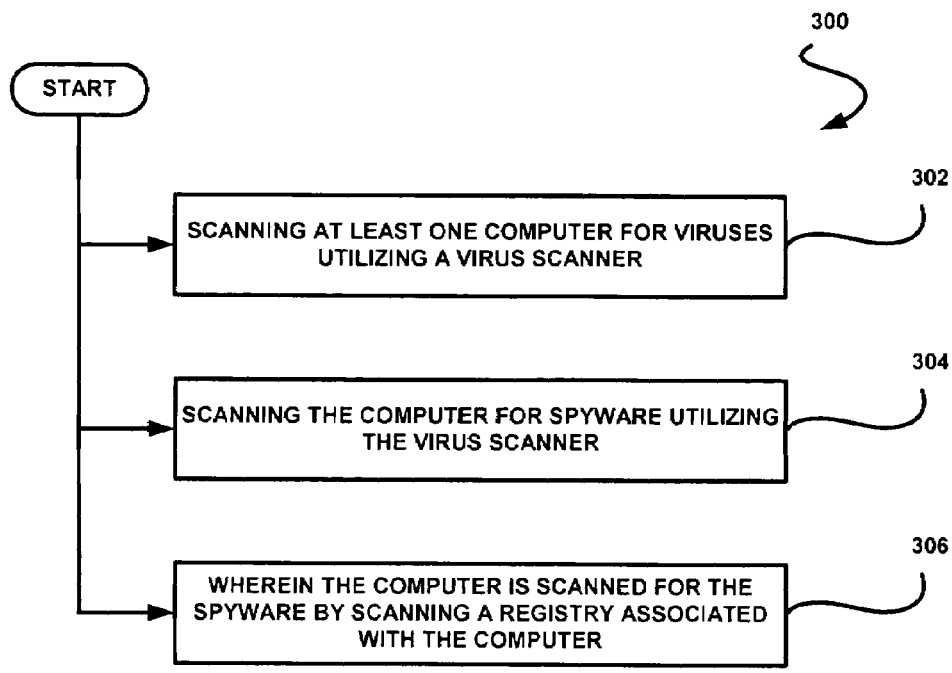
FIG. 3 illustrates a method for scanning for spyware utilizing a virus scanner, in accordance with one embodiment.

FIG. 3 illustrates a method 300 for scanning for spyware utilizing a virus scanner, in accordance with one embodiment. As an option, the present method 300 may be implemented in the context of the architecture and environment of FIGS. 1 and/or 2. Of course, however, the method 300 may be carried out in any desired environment.

In operation 302, at least one computer (e.g. see computers 104, 106 of FIG. 1, for example, etc.) is scanned for viruses utilizing a virus scanner. In the context of the present description, the term virus scanner may include any hardware, software, and/or logic that is capable of at least detecting viruses and, optionally, any other type of malware. Further in the context of the present description, malware (i.e. "malicious software") may refer to any programming or files that are developed for the purpose of doing harm to a computer and/or network components. Thus, malware may include, but is not limited to various forms of computer viruses, worms, Trojan horses, etc.

Further, in operation 304, the computer is further scanned for spyware utilizing the virus scanner. Again, in the context of the present description, the term spyware is deemed to include spyware, adware, dialer software, other equivalents, and/or any other software that is less malicious than conventional malware, etc. As shown in FIG. 3, the spyware and virus scanning may take place in parallel.

Of course, it should be noted that such spyware and virus scanning may be performed in parallel, in series, simultaneously, separately, etc., as long as the virus scanner is carrying out such scanning. While any of the foregoing options are possible, there may be a performance impact when spyware scanning is run simultaneously with virus scanning. Thus, separate scanning for spyware and viruses may be employed to prevent such performance impact.

Further, it should be noted that the spyware scanning should be deemed to be carried out by the virus scanner, even if only a sub-component, related component, etc. of the virus scanner is carrying out such spyware scanning. For example, it is conceivable that a comprehensive virus scanner may be equipped with a spyware component via an "upgrade," "update," etc. Still yet, the virus scanner may be part of a large single system (e.g. an enterprise system with a firewall, intrusion detection capabilities, etc.), which further includes a spyware scanning capability. Even still, the virus scanner may simply be sold with the spyware scanning capability, as a single system. In each of these instances (as well as others not explicitly set forth), the spyware scanning capability is deemed to be provided, at least in part, "utilizing the virus scanner."

In use, the computer is scanned for the spyware by scanning a registry associated therewith. Note operation 306. Spyware, in many (but not all) instances, may alter the registery in some way, thus making registry scanning an effective technique for detecting spyware.

In one embodiment, the registry may include a location on the computer for storing information such as hardware that is attached to the computer, system options that have been selected, a configuration of memory of the computer, and/or application programs to be present when an operating system of the computer is started. In the specific context of the MS WINDOWS operation system, the registry may include the sections noted in Table 1.

TABLE 1

HKEY_Classes_Root - file associations and OLE information
HKEY_Current_User - all preferences set for current user
HKEY_User - all the current user information for each user of the system
HKEY_Local_Machine - settings for hardware, operating system, and installed applications
HKEY_Current_Configuration - settings for the display and printers
HKEY_Dyn_Data - performance data Of course, in the context of the present description, the registry may include any data used by an operating system to store configuration information.

More information will now be set forth regarding one exemplary embodiment utilizing various optional features each of which may (or may not) be incorporated with the foregoing method 300 of FIG. 3, per the desires of the user.

Figure 4A:
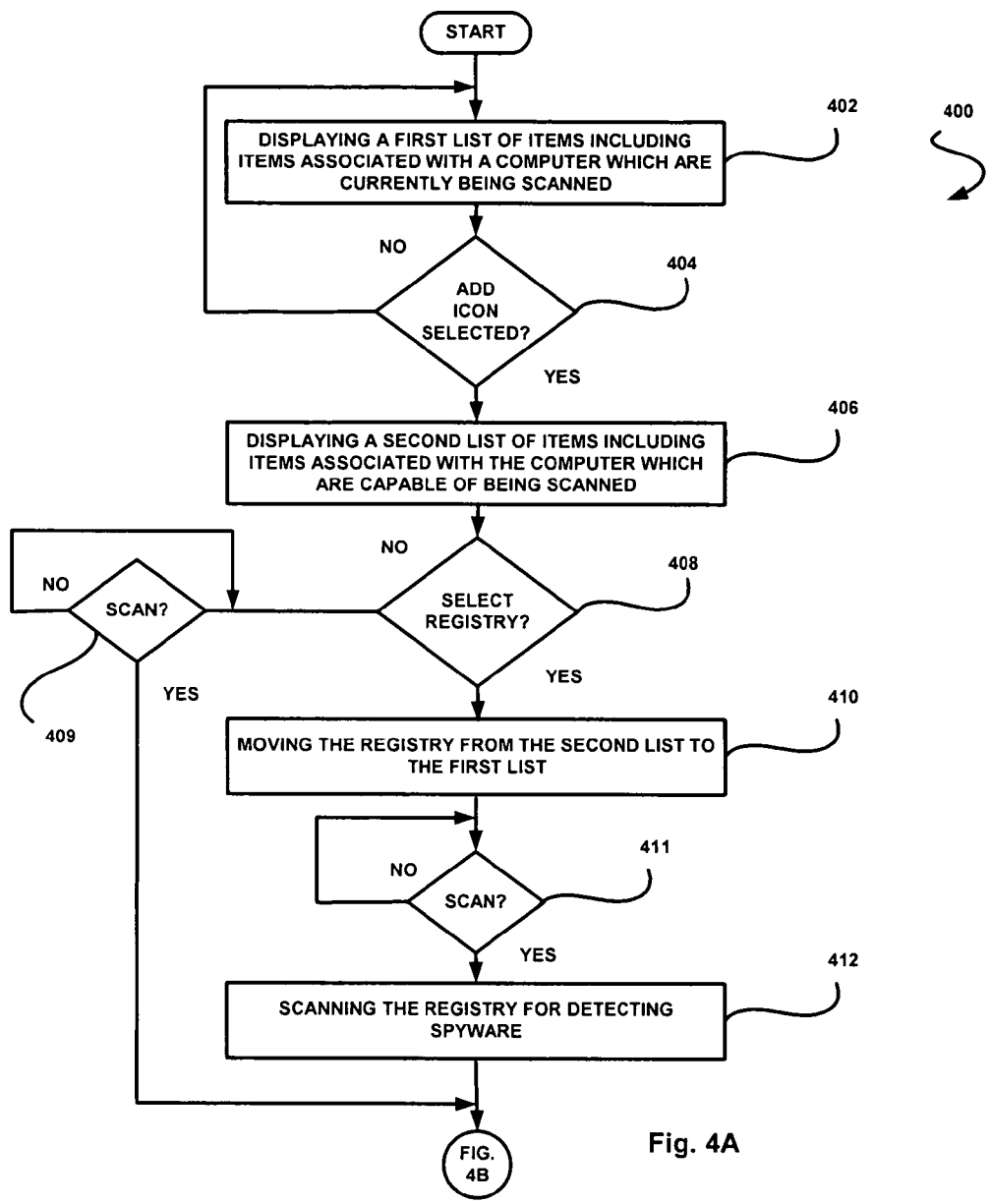
FIGS. 4A-4B illustrate a method for scanning for spyware utilizing a virus scanner, in accordance with another embodiment.
Figure 4B:
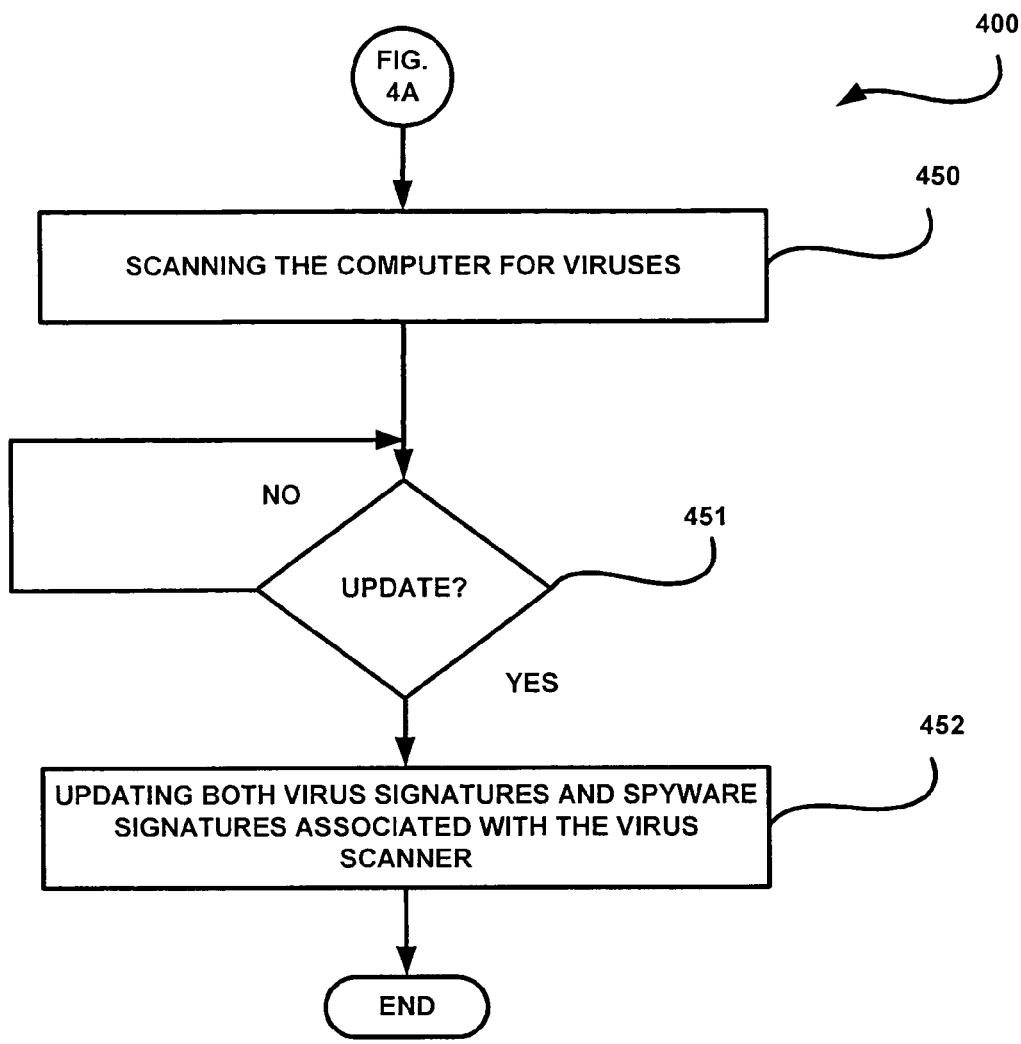

FIGS. 4A-4B illustrate a method 400 for scanning for spyware utilizing a virus scanner, in accordance with another embodiment. As an option, the present method 400 may be implemented in the context of the architecture and environment of FIGS. 1 and/or 2, and even the method 300 of FIG. 3. Of course, however, the method 400 may be carried out in any desired environment.

With reference first to FIG. 4A, a first list of items is displayed in operation 402. Such first list may include items associated with a computer (e.g. see computers 104, 106 of FIG. 1, for example, etc.) which are currently being scanned. Thus, the first list may operate to identify and track which items of the computer are being scanned during use of the virus scanner.

In use, it is determined whether an add icon has been selected by a user. Note decision 404. As will soon become apparent, the add icon allows the user to add additional items to the first list, thus ensuring that such additional items are included in a scan. To this end, upon detection of the selection of the icon by the user, a second list of items is displayed. Note operation 406. Such second list includes items associated with the computer which are capable of being scanned (and not already being scanned per the first list). Moreover, such second list of items includes a registry of the computer, for scanning for spyware, as will soon become apparent.

It is then determined in decision 408 whether the user selects the registry in the second list. Upon the detection of the selection of the registry in the second list (as determined in decision 408), the registry is moved from the second list to the first list. Note operation 410. Movement of the registry in such manner thus provides a technique for optionally allowing the registry to be scanned for detecting spyware.

While the method 400 has set forth a technique for including spyware scanning (by movement of the registry item from the second list to the first list), it should be noted that a remove button may also be used to disable spyware scanning (by movement of the registry item from the first list to the second list). To this end, the registry associated with the computer may be conditionally scanned based on user input. More information regarding an exemplary graphical user interface for facilitating the forgoing functionality will be set forth hereinafter in greater detail.

In decisions 409 and 411, it is determined whether a scan should take place. Of course, such determination may take any form based on whether the scanner is an on-demand, on-access, etc. scanner. If it is determined in decision 411 that a scan should take place, the registry of the computer is scanned for detecting spyware, utilizing the virus scanner (since the registry was moved to the first list, etc.). Note operation 412. As an option, a user interface that indicates, in real-time, when and what is being scanned, may be updated to indicate the registry, during operation 412. If, however, it is determined in decision 409 that a scan should take place, the registry of the computer is not scanned for detecting spyware (since the registry was not moved to the first list, etc.).

In any case, if it is determined in either decision 409 or 411 that a scan should take place, the computer is scanned for viruses, utilizing the virus scanner. See operation 450 of FIG. 4B.

With continuing reference to FIG. 4B, it is determined in decision 451, whether an update event is detected. Of course, such update event may be manually initiated and/or automatically initiated by a client and/or server based on a periodic basis, predetermined scheduling, etc. Upon the detection of the update event, both virus signatures and spyware signatures associated with the virus scanner are updated. Note operation 452.

As an option, the spyware signatures and virus signatures of the virus scanner may be updated via a network (e.g. see, for example, networks 102 of FIG. 1, etc.). More particularly, the spyware signatures and virus signatures of the virus scanner may be updated together and/or simultaneously. By coordinating the updating of the virus and spyware signature updates, updating mechanisms need not be duplicated. Moreover, any overlap in the signatures themselves can be eliminated. Table 2 illustrates an exemplary log of an illustrative update process.

TABLE 2

Figure 5:
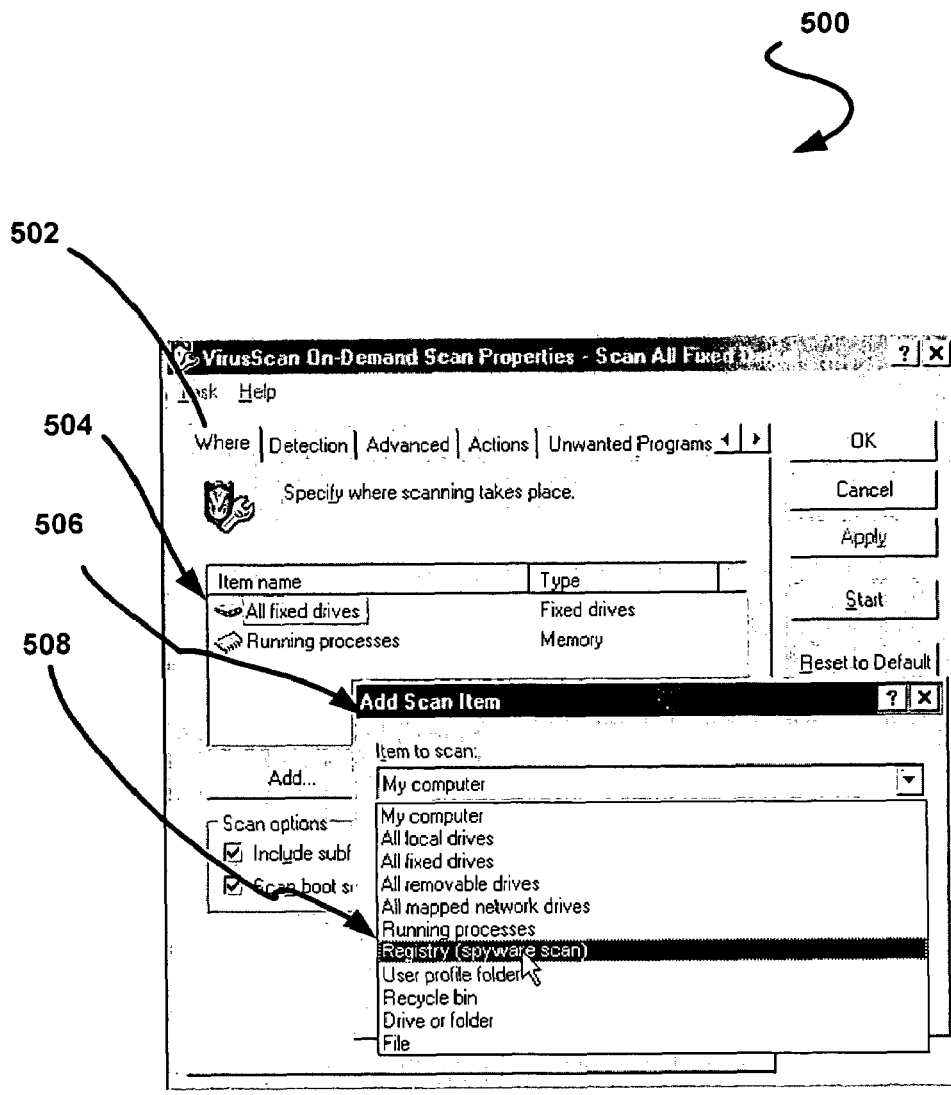
FIG. 5 illustrates an exemplary graphical user interface for scanning for spyware utilizing a virus scanner, in accordance with one embodiment.

Updating Virus Signatures
    Downloading DAT4390.ZIP
    Installing 4390 Signatures
Updating AntiSpyware Signatures
    Downloading SPY3820.ZIP
    Installing 3820 Signatures FIG. 5 illustrates an exemplary graphical user interface 500 for scanning for spyware utilizing a virus scanner, in accordance with one embodiment. As an option, the present interface 500 may be implemented in the context of the architecture and environment of FIGS. 1 and/or 2, and even the methods 300 and 400 of FIGS. 3-4B. Of course, however, the interface 500 may be carried out in any desired environment.

As shown, a graphical user interface 500 is provided which may be displayed in an options menu associated with a virus scanner. Specifically, such interface 500 may be displayed upon a user initiating the options menu while using the virus scanner. As mentioned earlier, the interface 500 may include a field for receiving the user input for controlling the virus scanner with respect to spyware scanning.

Specifically, such field of the graphical user interface 500 may include a first list 504 of items associated with the computer. Such first list 504 may include items associated with the computer which are being scanned.

Associated therewith is a second list 506 that may be displayed upon the selection of an icon (e.g. an "add" icon, etc.). Such items of the second list 506 may include the registry 508. Further, the items of the second list 506 may include additional items associated with the computer which are capable of being scanned upon the selection thereof. As shown, such items may further include local drives, fixed drives, removable drives, network drives, running processes, a user profile folder, and/or a recycle bin.

In use, the items of the second list 506 may be moved to the first list 508 upon the selection thereof, as set forth earlier. To this end, duplication of options, updating, etc. between the virus and spyware scanning is removed.

Thus, the present embodiment is capable of exploiting the similarities of virus and spyware scanning for removing duplication, etc. For example, at a high level, a virus scanner often needs to examine various parts of the computer to look for suspicious files or configuration data. Still yet, reports of what has been found and cleaned sometimes need to be generated and correlated so that an administrator can track anomalies in an organization. Spyware, like new viruses, is continuously being written, so analysis of new samples may be needed and the results of this analysis may need to get to the computers running the scanner in the form of periodic updates to signatures, etc.

Of course, the virus scanner may account for the differences between virus and spyware scanning, to accommodate the same. Reporting may require a different level of granularity and urgency. With a virus, many files may be infected with the virus. With spyware, on the other hand, there is often just once instance installed, but it may consist of different files and registry entries. A virus outbreak is also much more serious than spyware being found. Spyware is typically less malicious and does not actively try to spread from computer to computer (in most cases). Generating instant alerts and responses may thus be applied to virus scanning, but may be avoided during spyware scanning in some situations.

Still yet, a new virus may be released and spread around the world in minutes. A mechanism for extremely fast deployment of new signatures for detection may thus be important when virus scanning. Spyware, on the other hand, spreads slowly, is less malicious, and is easier to remove when detected. Therefore, the frequency/number of updating instances of the spyware signatures may be less than virus signature updates, in one embodiment.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for scanning for spyware utilizing a virus scanner, comprising:
   scanning at least one computer for viruses utilizing, a virus scanner; and
   scanning the at least one computer for spyware utilizing the virus scanner;
   wherein the at least one computer is scanned for the spyware by scanning a registry associated with the at least one computer;
   wherein the registry associated with the at least one computer is conditionally scanned based on user input;
   wherein the virus scanner includes a graphical user interface;
   wherein the graphical user interface includes a field for receiving the user input;
   wherein the field of the graphical user interface includes a list of items associated with the at least one computer;
   wherein the items are listed in a first list, the first list including items associated with the at least one computer which are being scanned;
   wherein a second list is displayed upon a selection of an icon;
   wherein the items of the second list include items associated with the at least one computer which are capable of being scanned upon the selection thereof;
   wherein the items of the second list are moved to the first list upon a selection thereof.

2. The method as recited in claim 1, wherein the field is displayed in an options menu.

3. The method as recited in claim 1, wherein the items include the registry.

4. The method as recited in claim 3, wherein the registry includes a location on the at least me computer for storing information selected from a group consisting of hardware that is attached to the at least one computer, system options that have been selected, a configuration of memory of the at least one computer, and application programs to be present when an operating, system of the at least one computer is started.

5. The method as recited in claim 4, wherein the registry includes a location on the at least one computer for storing information including hardware that is attached to the at least one computer, system options that have been selected, a configuration of memory of the at least one computer, and application programs to be present when an operating system of the at least one computer is started.

6. The method as recited in claim 3, wherein the items are further selected from a group consisting of local, drives, fixed drives, removable drives, network drives, running processes, a user profile folder, and a recycle bin.

7. The method as recited in claim 6, wherein the items further include local drives, fixed drives, removable drives, network drives, running processes, a user profile folder, and a recycle bin.

8. The method as recited in claim 1, wherein spyware signatures and virus signatures of the virus scanner are updated via a network.

9. The method as recited in claim 8, wherein the spyware signatures and the virus signatures of the virus scanner are updated together.

10. The method as recited in claim 8, wherein the spyware signatures and the virus signatures of the virus scanner are updated simultaneously.

11. The method as recited in claim 1, wherein the method is utilized to counter terrorism.

12. The method as recited in claim 1, wherein the spyware includes adware.

13. The method as recited in claim 1, wherein the spyware includes dialer software.

14. A virus scanner graphical user interface system for scanning for spyware utilizing a virus scanner, comprising:
   a graphical user interface for displaying a plurality of options associated with scanning at least one computer for viruses utilizing a virus scanner, and scanning the at least one computer for spyware utilizing the virus scanner;
   wherein the options include an option for scanning a registry associated with the at least one computer to scan for the spyware;
   wherein, upon detection of a selection of an icon by a user, a list including the registry is displayed such that, upon selection of the registry by the user, the registry is moved to another list including items to be scanned.

15. A system for scanning for spyware utilizing a virus scanner, comprising:
   means for scanning at least one computer for viruses utilizing a virus scanner; and
   means for scanning the at least one computer for spyware utilizing the virus scanner;
   wherein the at least one computer is scanned for the spyware by scanning a registry associated with the at least one computer;
   wherein, upon detection of a selection of an icon by a user, a list including the registry is displayed such that, upon selection of the registry by the user, the registry is moved to another list including items to be scanned.

16. A system for scanning for spyware utilizing a virus scanner, comprising:
   a virus scanner, the virus scanner capable of scanning at least one computer for viruses, and scanning the at least one computer for spyware;
   wherein the at least one computer is scanned for the spyware by scanning a registry associated with the at least one computer;
   wherein, upon detection of a selection of an icon by a user, a list including the registry is displayed Such that, upon selection of the registry by the user, the registry is moved to another list including items to be scanned.

17. A system for scanning for spyware and malware, comprising:
   a single application capable of scanning at least one computer for malware, and scanning the at least one computer for spyware;
   wherein, upon detection of a selection of an icon by a user, a list including a registry is displayed such that, upon selection of the registry by the user, the registry is moved to another list including items to be scanned.

18. A method for scanning for spyware utilizing a virus scanner, comprising:
   scanning at least one computer for viruses utilizing a virus scanner;
   scanning the at least one computer for spyware utilizing the virus scanner; and
   updating both virus signatures and spyware signatures associated with the virus scanner, by way of a network;
   wherein, upon detection of a selection of an icon by a user, a list including a registry is displayed such that, upon selection of the registry by the user, the registry is moved to another list including items to be scanned.

19. A system for scanning for spyware utilizing a virus scanner, comprising:
   a virus scanner, the virus scanner capable of scanning at least one computer for viruses, and scanning the at least one computer for spyware;
   wherein both virus signatures and spyware signatures associated with the virus scanner are updated by way of a network;
   wherein, upon detection of a selection of an icon by a user, a list including a registry is displayed such that, upon selection of the registry by the user, the registry is moved to another list including item to be scanned.

20. A method for scanning for spyware utilizing a virus scanner, comprising:
   displaying a first list of items including items associated with a computer which are currently being scanned;
   detecting the selection of an icon by a user;
   upon the detection of the selection of the icon by the user, displaying a second list of items including items associated with the computer which are capable of being scanned, the second list of items including a registry of the computer;
   detecting the selection of the registry in the second list;
   upon the detection of the selection of the, registry in the second list:
      moving the registry from the second list to the first list, and
      scanning the computer for viruses and scanning the registry of the computer for detecting spyware, utilizing the virus scanner;
   detecting an update event; and
   upon the detection of the update event, updating both virus signatures and spyware signatures associated with the virus scanner.

* * * * *